(12) United States Patent
Lee

(10) Patent No.: US 8,099,406 B2
(45) Date of Patent: Jan. 17, 2012

(54) METHOD FOR HUMAN EDITING OF INFORMATION IN SEARCH RESULTS

(76) Inventor: Bryant Christopher Lee, Cambridge, MA (US)

(*) Notice: Subject to any disclaimer, the term of this patent is extended or adjusted under 35 U.S.C. 154(b) by 0 days.

(21) Appl. No.: 12/983,363

(22) Filed: Jan. 3, 2011

(65) Prior Publication Data

US 2011/0191317 A1    Aug. 4, 2011

Related U.S. Application Data

(60) Provisional application No. 61/299,994, filed on Jan. 31, 2010, provisional application No. 61/302,117, filed on Feb. 6, 2010.

(51) Int. Cl.
*G06F 7/00* (2006.01)
*G06F 17/30* (2006.01)
(52) U.S. Cl. .................. 707/706; 707/722; 707/769
(58) Field of Classification Search .................. 707/694, 707/695, 706, 722, 769
See application file for complete search history.

(56) References Cited

U.S. PATENT DOCUMENTS

| | | | |
|---|---|---|---|
| 6,285,999 B1 | 9/2001 | Page | |
| 7,340,438 B2* | 3/2008 | Nordman et al. | 705/64 |
| 7,418,661 B2* | 8/2008 | Brandenberger | 715/255 |
| 7,447,678 B2 | 11/2008 | Taylor et al. | |
| 7,472,119 B2* | 12/2008 | Dai et al. | 707/5 |
| 7,599,950 B2* | 10/2009 | Walther et al. | 707/101 |
| 7,689,578 B2* | 3/2010 | Albornoz et al. | 715/230 |
| 2002/0083090 A1* | 6/2002 | Jeffrey et al. | 707/501.1 |
| 2003/0023754 A1* | 1/2003 | Eichstadt et al. | 709/246 |
| 2004/0078432 A1* | 4/2004 | Manber et al. | 709/205 |
| 2004/0210602 A1* | 10/2004 | Hillis et al. | 707/104.1 |
| 2005/0216454 A1* | 9/2005 | Diab et al. | 707/3 |
| 2005/0262427 A1 | 11/2005 | Cantwell et al. | |
| 2006/0206462 A1* | 9/2006 | Barber | 707/3 |
| 2008/0154879 A1 | 6/2008 | Lin | |
| 2008/0162540 A1 | 7/2008 | Parikh et al. | |
| 2009/0077056 A1 | 3/2009 | Ravikumar et al. | |
| 2009/0287682 A1* | 11/2009 | Fujioka et al. | 707/5 |

OTHER PUBLICATIONS

The CAPTCHA Project, "TheCaptchaProject: Gimpy", http://web.archive.org/web/20011201050359/www.captcha.net/gimpy.html, pp. 1.*

Wikipedia, currently available web site product provided by Wikimedia Foundation, operable at www.wikipedia.org, created in 2001, example exhibits provided herein in the form of screenshots and content.

* cited by examiner

*Primary Examiner* — James Trujillo

(57) ABSTRACT

A search engine may perform a search for a user search query. Result items may be returned as a result of the search. The user may enter new human edited information for some of the result items. The new human edited information may be displayed when other users search and view some of the result items at a later time.

20 Claims, 3 Drawing Sheets

METHOD FOR HUMAN EDITING OF INFORMATION IN SEARCH RESULTS

CROSS-REFERENCE TO RELATED APPLICATIONS

This application claims priority from U.S. provisional patent application Ser. No. 61/299,994 filed Jan. 31, 2010 and U.S. provisional patent application Ser. No. 61/302,117 filed Feb. 6, 2010, which are both incorporated herein by reference.

FIELD OF THE INVENTION

The present invention relates generally to search engines, and more particularly, to methods of human editing of information in search engine results and to user interfaces that are used to display search engine results.

BACKGROUND

Search engines assist users in finding relevant documents or other informational content from among a larger corpus. For example, search engines may be used to find relevant files among many files on a disk. A common application of search engines is to assist users in finding information on the World Wide Web ("Web"), which comprises a massive network of Web documents. The user submits a word or phrase he or she is interested in (called a search query), and the search engine seeks to provide a list of high quality Web documents that are relevant to that query. The list of Web documents is usually ranked with higher-quality and more relevant documents appearing first.

The list of Web documents usually includes a display of information related to each document such as a title, a content summary, images from the document, other media files such as video or sound recordings, a Uniform Resource Locator (URL), or other information.

One problem with search engines is that the information displayed with each Web document in the results list, including the title, content summary, images, URL, other media files, and other information, is often inaccurate, ungrammatical, or not the most helpful that it could be to users. A second problem is that users who notice this problem do not have a means to fix it so that future users can view more accurate, grammatical, or helpful information.

SUMMARY OF THE INVENTION

One aspect of the invention is directed to a method that includes receiving at the computer system a search query from a user. The method includes performing a search over a set of data in response to the search query, the set of data being at the computer system or accessible to the computer system. The method includes generating a set of result items returned from the search over the set of data. The method includes presenting the set of result items in conjunction with a method of using human edited information in search engine results. The method includes displaying the set of result items and the previously human edited information for at least one result item in a results document.

One aspect of the invention is directed to a method that includes receiving at the computer system a search query from a user. The method includes performing a search over a set of data in response to the search query, the set of data being at the computer system or accessible to the computer system. The method includes generating a set of result items returned from the search over the set of data. The method includes presenting the set of result items in conjunction with a method of using human edited information in search engine results. The method includes retrieving from the database previously human edited information for at least one result item in the set of result items. The previously human edited information for the at least one result item was provided by other users by deleting, modifying, or entering information for the at least one result item, and the at least one result item was displayed in a prior results document that was returned after the other users conducted a search earlier in time. The method includes displaying the set of result items and the previously human edited information for at least one result item in a results document. The user may enter human edited information where the human edited information may be stored in a database to be available for potential later use in presenting human edited information of a later set of result items returned in response to later search queries of later users.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

DETAILED DESCRIPTION

Figure 1:
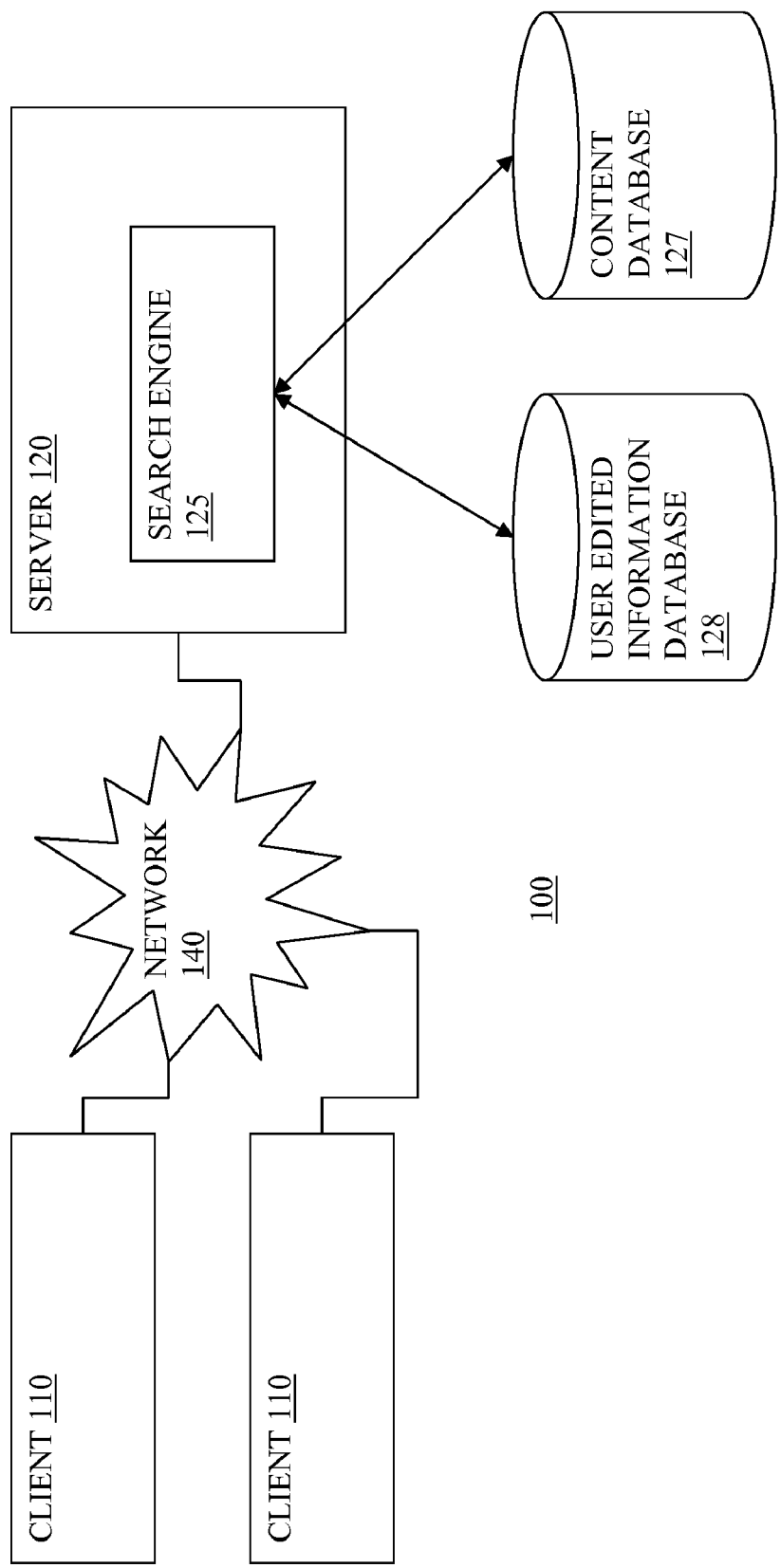
FIG. 1 is a diagram illustrating an exemplary environment in which one embodiment of the present invention may operate.

FIG. 1 is a block diagram illustrating an exemplary network environment 100 for implementation of one embodiment of the present invention. The network environment 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and one server 120 have been illustrated for simplicity, though in practice there may be more or fewer clients and servers.

Clients 110 may be personal computers, digital assistants, personal digital assistants, cellular phones, mobile phones, smart phones, pagers, digital tablets, laptop computers, Internet appliances, and other processor-based devices. Servers 120 may include entities that process, search, and/or maintain documents in a manner consistent with the principles of the invention. Server 120 may be implemented as a number of networked server devices, though it is illustrated as a single entity.

Server 120 may include a search engine 125 that can receive search queries from clients 110. In one embodiment, the search engine 125 may function as a query-based web search engine. The search engine may cause the output, such as the display, of search results on the client 110.

In one embodiment, the search engine 125 processes queries for documents located on the network. It may process queries by searching the content database 127 in which documents and/or index information about documents on the network are stored. It may return a list of the documents and/or index information (called the list of search result items) and may rank these search result items according to relevancy and quality.

In one embodiment, the list of search result items includes related information for each item such as a title, content summary, images, other media files such as video or sound recordings, a URL, tags, or other information. The search engine may access the user edited information database 128 for previous user edits made to each item's related information and apply these edits so that the related information for each item displayed to the user is in accord with these edits. The user edited information database 128 might contain only edits to the related information, so that the edits must be applied to the default related information to produce human edited related information, or the user edited information database 128 may contain the related information itself in edited form and may contain past versions of the related information that existed before and after certain edits were made. In this patent, the term "related information" of a result item includes information such as a title, content summary, images, other media files such as video or sound recordings, a URL, or other information.

Those skilled in the art will appreciate that the documents and/or index information about documents in the content database 127 and the user edits in the user edited information database 128 may be stored in a single database or in more or fewer databases. Alternatively, they may be stored in a networked system of databases. It is for simplicity of illustration that these elements are described as residing in different databases. The term database as used in this patent may refer to a computer database or any data storage or network of data storage.

Figure 2:
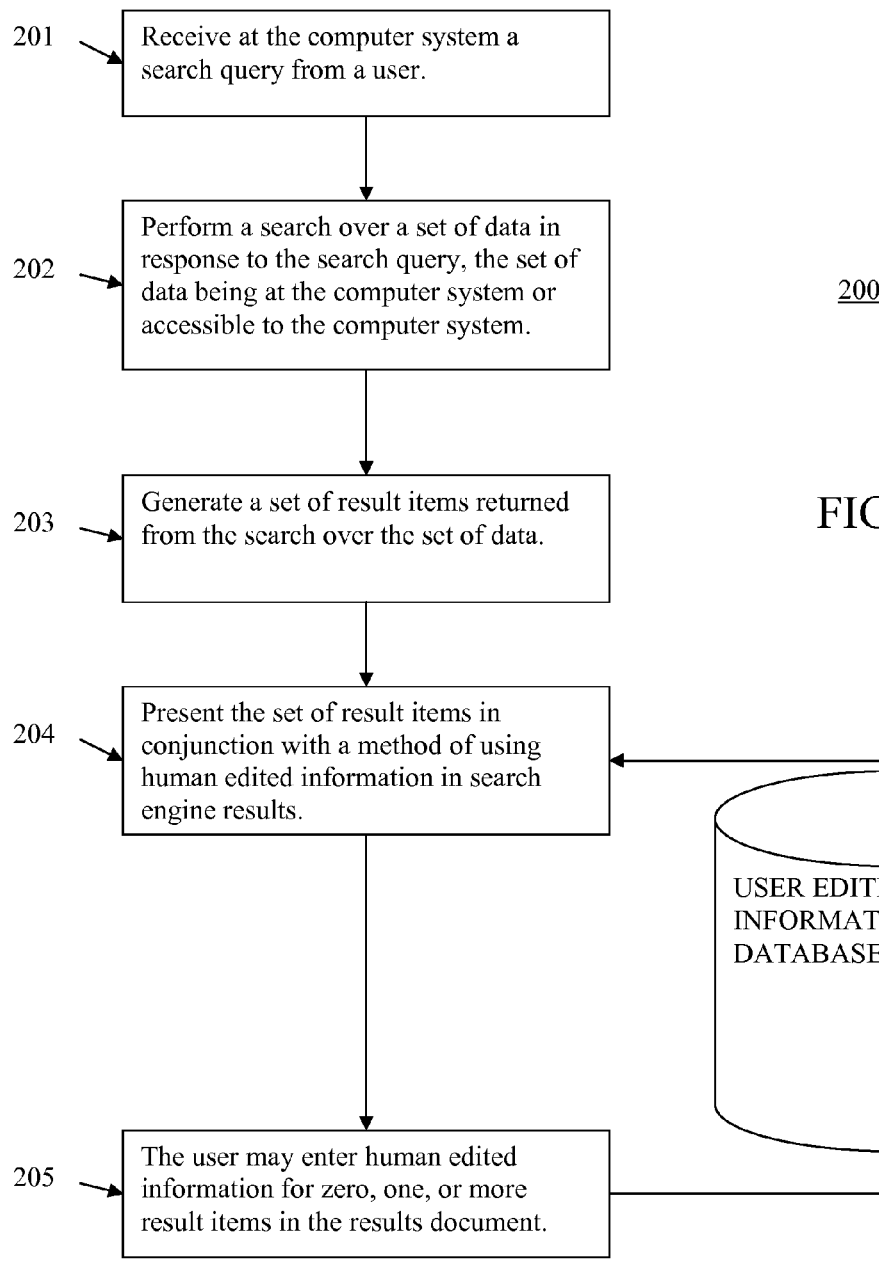
FIG. 2 is a flow diagram illustrating operations that may be performed for human editing of information in search results in one embodiment of the present invention.

FIG. 2 is a flow chart illustrating a method 200 that may be performed by search engine 125 consistent with aspects of the invention. Search engine 125 may receive a search query from a user (act 201). The search query may be received at the server 120. The user may provide the search query either at the server 120 or at a client 110 that is connected to the server 120 over the network 140. In response, the search engine may perform a search over a set of data, where the set of data is at the computer system or accessible to the computer system (act 202). The set of data that is searched over may be the content database 127. The set of data that is searched over may be an index of web documents. The index of web documents may have been generated by a web crawler. The search engine may comprise a web crawler. The set of data that is searched over may be an index of files on a computer system. The search engine may generate a set of result items returned from the search over the set of data (act 203). The set of result items may be ranked for relevancy and quality. The search engine may present the set of result items in conjunction with a method of using human edited information in search engine results (act 204). Act 204 may include retrieving from the user edited information database 128 previously human edited information for at least one result item in the set of result items. The previously human edited information for the at least one result item may have been provided by other users by deleting, modifying, or entering information for the at least one result item, where the at least one result item had been displayed in a prior results document that was returned after the other users conducted a search earlier in time. The result item may have been returned as a result of a search by other users earlier in time. The other users may have edited the related information of the result item after receiving the results of that search. Act 204 may include displaying the set of result items and the previously human edited information for the at least one result item in a results document. The user may enter human edited information for zero, one, or more of the result items in the set of result items in the results document, such human edited information to be stored in the user edited information database 128 to be available for potential later use in presenting human edited information of a later set of result items returned in response to later search queries of later users (act 205). In one embodiment, the user may be required to press a "submit" button or take some other action before the human edited information is added into the user edited information database 128. In another embodiment, the user's edits may be entered into the user edited information database 128 without the user being required to "submit" the edits via an explicit action.

For some result items, the related information may be automatically generated. The related information may include an automatically generated title, content summary, images, other media files such as video or sound recordings, URL, tags, or other information. Automatically generating related information may include automatically extracting content from a website. This may involve using a script or other computer code. A content summary can be automatically generated by using a computer program to automatically summarize a web page. This may include parsing the web page. This may include looking for key words in the web page. This may include identifying the terms of the search query in the web page and displaying relevant or nearby portions of text to the terms of the search query in the web page. Related information may comprise portions that are automatically generated and other portions that are human edited. In some embodiments, a human user may edit automatically generated related information, thereby making the related information human edited and no longer automatically generated. In some cases, the search engine will display automatically generated related information for a result item until a user makes human edits to the related information. In some embodiments, a result item having automatically generated related information will include an indication that the related information is automatically generated. In some embodiments, a result item having no related information will include an indication suggesting that the user should add human edited related information. Some result items may have no related information.

In some embodiments, a result item in the search engine may have automatically generated information and human edited information for the same kind of information. A result item may have both an automatically generated content summary and a human edited content summary. Likewise for the other kinds of related information.

In one embodiment, the related information for some result items may be initially populated with information provided by human workers. The human workers may be employees or volunteers. The human workers may be paid or unpaid. The related information may later be edited by users.

The related information that is editable may have an indication that indicates that it is editable. This may be helpful because most users may not realize that the related information can be edited. The indication may be text or may be an indicative graphical symbol. The indication may be an image or a video or an animated image. Related information that is not editable may have no indication or may have an indication that it is not editable.

In some embodiments, only some fields of related information are editable and others are not. If the user attempts to edit a field of related information that is not editable, a message may be displayed indicating that the field of related information is not editable.

In some embodiments, there is a size limitation on the size of related information. There may be a length limitation on the content summary of a result item. The user may be prevented from entering human edited information in excess of the length limitation. There may be a length limitation on the title and URL fields of related information. In some embodiments, a long related information may be allowed but a user viewing the related information is only shown part of it and must press a button to view the whole of the related information.

In some embodiments, the user may be allowed to enter a reason for entering the human edited information for a result item. Such a reason may include but is not limited to correcting a spelling mistake, correcting misleading information, adding more specificity, or any other reason.

In this patent, the term "same search query" is defined as a search query that is similar or substantially the same. Two search queries need not be exactly identical to be the "same search query." For example, a search query of "Michael Jordan" may be the "same search query" as "the Michael Jordan," "person Michael Jordan," "Michael Jordan basketball," "Michael J basketball player," and so on in some embodiments of the invention. In this patent, the term "user" means end users or consumers. It does not refer to administrative users or owners of the search engine.

In one embodiment, after the user edits related information for an item, the entire contents of the particular fields of related information that was changed is stored in the user edited information database 128. When a later user performs a search query that results in the display of said item, the entire contents of the related information for said item is retrieved from the user edited information database 128 and displayed with said item.

Alternatively, after the user edits related information for an item, only the changes made by the user are stored in the user edited information database 128. When a later user performs a search query that results in the display of said item, changes made to the related information for that item by previous users are retrieved from the user edits database 128 and applied to the related information for that item. The version of the related information displayed to the user is that resulting after the user edits are applied.

The user edited information database 128 can store human edited information in many ways, not limited by the specific examples given above.

In one embodiment of the invention, the search engine may include a system of user accounts. Users may log in. Logging in may require a password. Users may provide information about themselves including a photo, a user name, contact information, physical address, occupation, hobbies, personal interests, marital status, and other personal and general information. Users may have a personal page where other users can leave messages. The personal page may display information about the user. Users may elect to have some information be private and not be displayed. Users may elect not to have their contact information displayed to other users.

In one embodiment, the user may only enter human edited information for the result items in the set of result items in the results document if the user has editing permissions. Editing permissions may be given to all or less than all of the users of the invention. Editing permissions may be given or taken away from a user at different times. Some users may receive editing permissions when they create a user account. Other users may not receive editing permissions when they create a user account. There may be different levels of editing permissions.

In one embodiment, the user must pass a test to show he or she is a human and not a computer program before the user can enter human edited information for the result items in the set of result items in the results document.

In one embodiment, the user may only enter human edited information for the result items in the set of result items in the results document a limited number of times over a limited time period.

In one embodiment, the only human edited information displayed for a result item is the human edited information that was entered by other users who conducted a search using substantially the same search query earlier in time. For example, supposing Website A sells pet food, other users who search for "buy dog food" may see Website A in a results document and may edit the content summary of website A to read "This is a good place to buy dog food." If the user searches for "buy dog food" then the user may see Website A in the results document and will see the human edited content summary "This is a good place to buy dog food." If the user searches for "buy pet food" then Website A may be returned but the human edited information "This is a good place to buy dog food" may not be displayed.

In one embodiment, the users of the invention are divided into one or more classes. If the user is in a class, then when the user performs a search the only human edited information for result items that is displayed is human edited information entered by other users who are in the same class as the user. An example of a class is "interested in sports." It may be appreciated that users may be assigned to classes in many ways and not just according to interest area. Other kinds of classes may be: users who are female, users who are over the age of 25, users who have a college education, users who work in the computer software industry, and so on. It may be appreciated that classes may be automatically assigned, assigned by running a computer program, assigned by manual intervention, or specified by the user.

In one embodiment, result items in the results document may be displayed with an image. The image is a part of the related information. The image may be edited, changed, or uploaded by the users.

In one embodiment, result items in the results document may be displayed with a video. The video is a part of the related information. The video may be edited, changed, or uploaded by the users.

In one embodiment, the related information of a result item in the results document may be entered via a markup language. The markup language may allow specifying how text is displayed including but not limited to specifying that text be bolded, be of a certain color, be of a certain font, be of a certain font size, be a header, be spaced or formatted in a certain way, or other specifications of format or display. The markup language may allow specifying that text be hyperlinked. The markup language may allow specifying text be hyperlinked to a document internal or external to the search engine or the domain of the search engine. The hyperlinked text, when clicked, may take the user to another document. The markup language may allow specifying how media is displayed. It may allow specifying the size or scaling of an image or video. It may allow specifying that an interface for playing a sound recording be displayed.

In one embodiment, the user may add himself to a watch list of a result item. When another user edits the related information of the result item of which the user is on the watch list, the user is notified by a message sent to the user's account or by email or by another means of communication. A user may wish to be on a watch list so he can observe and eliminate edits to related information that he disagrees with or that are wrong or misleading. A user may wish to be on a watch list for many reasons.

In one embodiment, the user receives points for making human edits to related information. The points may be displayed on the user's profile. The points might be exchanged for rewards like physical objects or electronic gifts.

In one embodiment, users can rate the related information of a result item for how helpful it is. The rating may be done on a number scale or may be accomplished by voting up or voting down the related the information. The rating of helpfulness of the related information may be displayed when the result item is displayed. Users may be more motivated to make human edits to an item of related information if the related information is rated as unhelpful.

In one embodiment, human edits to related information of a result item may be filtered to remove profanity or inappropriate content.

Figure 3:
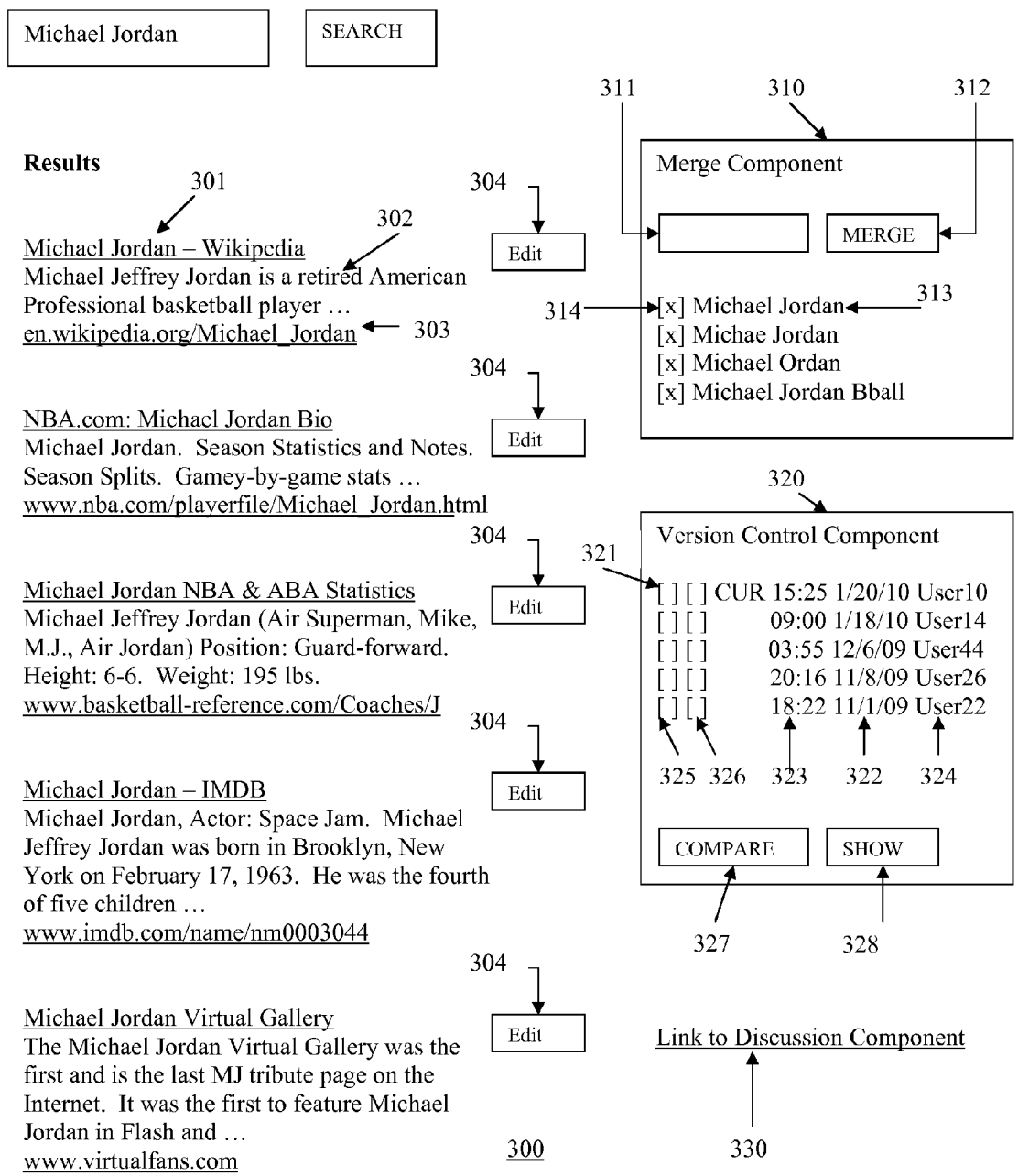
FIG. 3 is a diagram illustrating an exemplary results document that could be produced in accordance with one embodiment of the present invention.

FIG. 3 is a diagram illustrating an exemplary results document 300 displaying the results returned in response to a search query. The result items on results document 300 are exemplary result items returned by search engine 125 for the exemplary search "Michael Jordan." In one embodiment, each result item may be listed with a title 301, a summary of relevant content 302, and URL 303. The title 301 may be linked to the document. In other embodiments, the result items may be listed with more, less, or different information.

In one embodiment, the user may edit the related information of one or more result items listed on the results document. In one embodiment, this may be accomplished by clicking on the title 301, content summary 302, or URL 303 to select that particular field of the result item for editing. The user may edit the field of related information in place in some embodiments. Namely, the user may be allowed to edit the field of related information on the results document itself and see the results immediately. In other embodiments, the user may edit the field of related information on a different screen, and the edits may not show up until a later time. Other fields of related information not shown in FIG. 3 include images, other media files such as video or sound recordings, tags, or other information. These fields of related information may be edited by the user. In one embodiment, the user may click the "edit" button 304 to edit the related information of a particular result item. The human edits entered by the user may be stored in the user edited information database 128.

In one embodiment, a user may edit a field of related information by right clicking on it. In one embodiment, a user may edit a field of related information by right clicking on it and choosing an option to "edit" the field of related information.

In one embodiment, the results document includes user interface elements next to one or more result items. The user may enter human edited information for the one or more result items via the user interface elements.

In one embodiment, some or all result items may be accompanied by a text input box where the user may enter human edited information.

Those skilled in the art will recognize that many different kinds of user interface actions may be used to allow the user to enter human edited information and cause the human edited information to be stored in the user edited information database 128. The foregoing description of preferred embodiments provides illustration and description, but is not intended to be exhaustive or to limit implementation to the precise forms disclosed. Modifications and variations are possible in light of the above teachings or may be acquired from practice of the invention.

In one embodiment, a merge component 310 is included on the results document. In one embodiment, the search query received from the user is one search query from a set of merged search queries, and the human edited information displayed for a result item consists only of the human edited information that was entered by users for that result item when that result item was returned to those users who conducted a search using any search query from the set of merged search queries earlier in time. In this embodiment, human edited information entered by users who saw the result item as a result of a search query that is not in the set of merged search queries will not be displayed. The merge component may display information about one or more sets of merged search queries. The results document may include a link to a merge component that displays information about one or more sets of merged search queries rather than the merge component itself. The results document may include user interface elements that may be used to add one or more search queries to a set of merged search queries or to remove one or more search queries from a set of merged search queries.

The results document may include a merge component 310 that displays information about one or more sets of merged search queries or a link to a merge component 310 that displays information about one or more sets of merged search queries. The results document may include user interface elements that may be used to add one or more search queries to a set of merged search queries or to remove one or more search queries from a set of merged search queries. In one embodiment of the merge component 310, a text input field 311 allows entering a search query and a merge button 312 causes that search query to be added to the set of merged search queries 313. The set of merged search queries may include the search query submitted by the user to generate the current results document. Human edited information of results items on the results document may be displayed when searching for any of the merged search queries. An unmerge button 314 next to each currently merged search queries may, when clicked, cause the search query to be removed from the set of merged search queries.

In one embodiment, the results document includes a version control component 320 that displays information about one or more previous versions of the results document or a link to a version control component 320 that displays information about one or more previous versions of the results document. Each of the one or more previous versions of the results document may display a past human edited information of the set of result items, where the past human edited information of the set of result items was generated at the current time or having been generated at a previous time by a method of using human edited information comprising: retrieving from the database a previously human edited information for at least one result item in the set of result items; wherein the previously human edited information for the at least one result item was provided by the other users by deleting, modifying, or entering information for the at least one result item, the at least one result item having been displayed in a prior results document that was returned after the other users conducted a search earlier in time; wherein the other users deleted, modified, or entered the human edited information of the at least one result item prior to a specific time, the specific time being associated with the one or more previous versions of the results document; displaying the set of result items and the previously human edited information for the at least one result item in a results document.

In one embodiment of the version control component 320, the component may include information about the current version of the results document in a current version display 321. The component may include date information 322, time information 323, and user information 324 for previous versions of the results document, a previous version of the results document being a document displaying the human edited information provided by users up to a specific time that is earlier than the current time, the specific time being associated with the previous version of the results document. The date information 322 and time information 323 may reflect the specific earlier time that is associated with the previous version of the results document. The user information 324 may reflect the last user to enter human edited information before or at that specific time. Each of the current and previous version listings may include a first checkbox 325 and a second checkbox 326 allowing the selection of two previous versions of the results document simultaneously. The user may choose to view a differences between two or more previous versions of the results document. A display of the differences between the two selected previous versions may appear when the user clicks the compare button 327. The show button 328 may cause a previous version to be displayed, the user choosing which previous version to display using the first checkbox 325 or another interface element.

In one embodiment, the results document includes a discussion component 330 for user discussion or a link to a discussion component 330 for user discussion, the discussion component for user discussion comprising a wiki, a forum, a bulletin board, a chat room, or other interface component configured for user discussion.

While the invention has been particularly shown and described with reference to specific embodiments thereof, it will be understood by those skilled in the art that changes in the form and details of the disclosed embodiments may be made without departing from the spirit or scope of the invention.

What is claimed is:

1. A method for human editing of information in search engine results, the method performed by a computer system having access to a database, the method comprising:
   receiving at the computer system a search query from a user;
   performing a search over a set of data in response to the search query, the set of data being at the computer system or accessible to the computer system;
   generating a set of result items returned from the search over the set of data;
   presenting the set of result items in conjunction with a method of using human edited information in search engine results comprising:
      wherein some of the result items in the set of result items have fields associated with them;
      wherein a field is a visible interface element;
      wherein at least one result item has a human edited information field, which is a field that is configured to contain human edited information;
      retrieving from the database human edited information for the at least one result item in the set of result items and loading it into the human edited information field of the at least one result item;
      displaying the set of result items and the human edited information for the at least one result item in a results document;
      receiving input from the user in the human edited information field of the at least one result item where the input is used to enter changes to, modify, or delete the human edited information for the at least one result item;
      wherein the human edited information for a result item is a shared annotation that is editable by other users via the human edited information field of the result item;
      wherein at least part of the input received from the user is stored in the database to be available for later use in presenting human edited information of a later set of result items returned in response to later search queries of later users.

2. The method of claim 1, wherein the results document includes a discussion component for user discussion or a link to a discussion component for user discussion.

3. The method of claim 1, wherein the results document includes a version control component that displays information about one or more previous versions of the results document or a link to a version control component that displays information about one or more previous versions of the results document;
   wherein each of the one or more previous versions of the results document display a past human edited information of the set of result items, the past human edited information of the set of result items being generated at the current time or having been generated at a previous time by a method of using human edited information comprising:
      retrieving from the database past human edited information for the at least one result item in the set of result items and loading it into the human edited information field of the at least one result item;
      wherein the past human edited information for the at least one result item was received from other users in the human edited information field of the at least one result item, the at least one result item having been displayed in a prior results document that was returned to the other users;
      wherein the past human edited information was received from the other users prior to a specific time, the specific time being associated with the one or more previous versions of the results document;
      displaying the set of result items and the past human edited information for the at least one result item in the one or more previous versions of the results document.

4. The method of claim 1, wherein the human edited information of the at least one result item comprises a table of contents of the at least one result item.

5. The method of claim 1, wherein the human edited information of the at least one result item contains at least one textual sentence.

6. The method of claim 1, wherein the human edited information of the at least one result item comprises a list of keywords.

7. The method of claim 1, further comprising presenting a test to the user to determine that he or she is a human and not a computer program before user input of human edited information for the result items is accepted.

8. The method of claim 1, further comprising restrciting the user to entering human edited information for the result items in the set of result items in the results document at most a limited number of times over a limited time period.

9. The method of claim 1, wherein presenting the set of result items in conjunction with a method of using human edited information in search engine results further comprises:
wherein the displayed human edited information of the at least one result item only contains human edited information that was entered by other users into the human edited information field of the at least one result item from prior results documents that were returned in response to searches for substantially the same search query.

10. The method of claim 1, wherein the search query received from the user is one search query from a set of merged search queries;
wherein presenting the set of result items in conjunction with a method of using human edited information in search engine results further comprises:
wherein the displayed human edited information of the at least one result item only contains human edited information that was entered by other users into the human edited information field of the at least one result item from a prior results document that was returned after receipt of a search query from the set of merged search queries earlier in time.

11. The method of claim 10, wherein the results document includes a merge component that displays information about one or more sets of merged search queries or a link to a merge component that displays information about one or more sets of merged search queries.

12. The method of claim 10, wherein the results document includes user interface elements to add one or more search queries to a set of merged search queries or to remove one or more search queries from a set of merged search queries.

13. The method of claim 1, wherein the user and the other users are divided into one or more classes;
wherein the user is in a class;
wherein presenting the set of result items in conjunction with a method of using human edited information in search engine results further comprises:
wherein the displayed human edited information of the at least one result item only contains human edited information that was entered by other users in the same class as the user.

14. The method of claim 1, wherein the human edited information for the at least one result item in the set of result items that was retrieved from the database includes an image that was edited, changed, or uploaded by the other users.

15. The method of claim 1, wherein the human edited information for the at least one result item in the set of result items that was retrieved from the database includes a video that was edited, changed, or uploaded by the other users.

16. The method of claim 1, wherein input into the human edited information field is accepted in the form of a markup language.

17. The method of claim 1, wherein interface elements allow the user to add himself to a watch list of a result item;
wherein the user is notified by a message when another user edits the related information of the result item of which the user is on the watch list.

18. The method of claim 1, wherein the human edited information for the at least one result item in the set of result items provides a content summary for the at least one result item.

19. A system including at least one hardware computer system having access to a database, the system configured to:
receive at the computer system a search query from a user;
perform a search over a set of data in response to the search query, the set of data being at the computer system or accessible to the computer system;
generate a set of result items returned from the search over the set of data;
present the set of result items in conjunction with a method of using human edited information in search engine results comprising:
wherein some of the result items in the set of result items have fields associated with them;
wherein a field is a visible interface element;
wherein at least one result item has a human edited information field, which is a field that is configured to contain human edited information;
retrieving from the database human edited information for the at least one result item in the set of result items and loading it into the human edited information field of the at least one result item;
displaying the set of result items and the human edited information for the at least one result item in a results document;
receiving input from the user in the human edited information field of the at least one result item where the input is used to enter changes to, modify, or delete the human edited information for the at least one result item;
wherein the human edited information for a result item is a shared annotation that is editable by other users via the human edited information field of the result item;
wherein at least part of the input received from the user is stored in the database to be available for later use in presenting human edited information of a later set of result items returned in response to later search queries of later users.

20. A non-transitory computer usable physical medium for storing instructions having a computer readable program code embodied therein, said computer readable program code adapted to be executed to implement a method for human editing of information in search engine results, said method using a computer system having access to a database, said method comprising:
receiving at the computer system a search query from a user;
performing a search over a set of data in response to the search query, the set of data being at the computer system or accessible to the computer system;
generating a set of result items returned from the search over the set of data;
presenting the set of result items in conjunction with a method of using human edited information in search engine results comprising:
wherein some of the result items in the set of result items have fields associated with them;
wherein a field is a visible interface element;
wherein at least one result item has a human edited information field, which is a field that is configured to contain human edited information;
retrieving from the database human edited information for the at least one result item in the set of result items and loading it into the human edited information field of the at least one result item;
displaying the set of result items and the human edited information for the at least one result item in a results document;

receiving input from the user in the human edited information field of the at least one result item where the input is used to enter changes to, modify, or delete the human edited information for the at least one result item;

wherein the human edited information for a result item is a shared annotation that is editable by other users via the human edited information field of the result item;

wherein at least part of the input received from the user is stored in the database to be available for later use in presenting human edited information of a later set of result items returned in response to later search queries of later users.

* * * * *